United States Patent [19]

Jevanoff et al.

[11] Patent Number: 4,659,759

[45] Date of Patent: Apr. 21, 1987

[54] BITUMENOUS COMPOSITIONS

[75] Inventors: Andre Jevanoff, La Hulpe, Belgium; Edward N. Kresge, Watchung, N.J.

[73] Assignee: Exxon Research & Engineering Co., Florham Park, N.J.

[21] Appl. No.: 721,191

[22] Filed: Apr. 9, 1985

Related U.S. Application Data

[63] Continuation of Ser. No. 624,386, Jun. 25, 1984, abandoned.

[30] Foreign Application Priority Data

Jun. 28, 1983 [GB] United Kingdom ............... 8317540

[51] Int. Cl.$^4$ .................... C08J 3/04; C08L 23/06; C08L 23/12
[52] U.S. Cl. ..................................................... 524/68
[58] Field of Search .......................................... 524/68

[56] References Cited

U.S. PATENT DOCUMENTS

| | | | |
|---|---|---|---|
| 3,669,918 | 6/1972 | Raley, Jr. | 260/28.5 |
| 3,853,799 | 12/1974 | Behling et al. | 524/68 |
| 4,100,414 | 8/1978 | Lindsay et al. | 260/897 A |
| 4,314,921 | 2/1982 | Biegenzein | 524/68 |
| 4,409,345 | 10/1983 | Moteki et al. | 524/68 |

FOREIGN PATENT DOCUMENTS

| | | | |
|---|---|---|---|
| 1193628 | 6/1970 | United Kingdom | 524/68 |
| 1315968 | 5/1973 | United Kingdom | 524/68 |
| 1400145 | 7/1975 | United Kingdom | 524/68 |
| 1427307 | 3/1976 | United Kingdom | 524/68 |
| 1519508 | 7/1978 | United Kingdom | 524/68 |
| 2092517 | 8/1982 | United Kingdom | 524/68 |

*Primary Examiner*—John C. Bleutge
*Assistant Examiner*—Robert E. L. Sellers, II
*Attorney, Agent, or Firm*—S. H. Markowitz

[57] ABSTRACT

Bitumen modified with a modifier comprising a defined elastomeric component and a polyolefin component containing polyethylene and polypropylene has improved high temperatures and low temperature properties which make it especially suitable for roofing applications. The elastomeric component is an ethylene propylene copolymer having a broad compositional distribution with regard to its ethylene content.

17 Claims, No Drawings

BITUMENOUS COMPOSITIONS

CROSS REFERENCE TO RELATED APPLICATIONS

This application is a Rule 60 continuation of Ser. No. 624,386, filed June 25, 1984, now abandoned.

This invention relates to bituminous compositions having improved high temperature and low temperature properties, particularly but not exlusively such compositions which may be used in roofing applications.

Bitumen is frequently used in roof coverings, often in the form of layers of fabric which are impregnated with a soft bitumen and coated with a harder bitumen which may be a blown bitumen containing mineral fillers. However, these materials suffer from the problem that they cannot withstand prolonged outdoor exposure because temperature variations can lead to cracks in the harder bitumen layers and to non-recoverable deformations due to creep or flow of the viscous materials. To overcome this several layers for example five layers of bituminous roof covering are often used, but this inevitably leads to high laying and maintenance costs.

Attempts have been made to produce bituminous felts and suggestions have been made to improve the properties of the felts by modifying the bitumen with certain polymers. As yet however it has not been possible to obtain bituminous compositions which are completely satisfactory and readily produced, and which form commercially acceptable roofing materials having the desired properties. Ideally the modifier for the bitumen should be easily incorporated therein from particulate form to yield a homogenous composition which remains homogenous on storage, and should have a viscosity which permits use in normal roofing material manufacturing equipment. Thus, it is desirable that the roofing material obtained should have substantially no creep below 100° C., should have adequate flexibility at low temperatures, for example, down to −10° C. and as low a permanent set as possible after 25% elongation. In addition these properties should preferably be retained after 6 months at 70° C., or 1 month at 80° C. In addition to thermal stability it is desirable that the material should stand up well to UV radiation in accordance with the xenon test. This particular feature is however not of great importance since although it is now common in certain cases to leave the bituminous roofing materials exposed to sunlight, whereas hitherto it has been conventional to coat the materials with slate or chippings which would protect the base material from UV radiation, the base material is of course black and so UV attack is in any case only superficial.

It has been proposed to modify the properties of bitumen by blending with styrene-butadiene block copolymers. Although this generally improves the properties of the bitumen immediately after blending such as its low temperature creep resistance, flexibility and elastic recovery, it may have an adverse effect on the heat ageing and UV radiation resistance properties of roofing materials formed from the blend. Furthermore, styrene-butadiene copolymers can only be used in conjunction with certain specific bitumens, otherwise they are subject to a high mixing rejection rate, that is, separation out from the bitumen. It is also known to include atactic polypropylene to form a bitumen blend suitable for use on flat roofing applications; however the balance of properties obtained with such blends are generally not optimal.

It has been proposed in U.S. Pat. No. 3,669,918 (Dow Chemical Company) to include ethylene propylene copolymer rubbers into bitumen for roofing applications, but with no teaching as to the compositional distribution of such rubbers. We have found however that such rubbers may only be incorporated directly into bitumen if they have low molecular weight, since higher molecular weight polymers are impossible to disperse in the bitumen when using normal blending conditions. Moreover, incorporation of ethylene propylene rubbers alone into bitumen has been found to produce compositions having softening points below 100° C., whereas it is highly desirable for the softening point to be greater than 100° C. or even 120° C.

The incorporation into bitumen of ethylene propylene rubbers of high ethylene content, which are usually not readily usable with the bitumen, has been achieved according to GB No. 1 427 307 (SIPLAST) by using a polyolefin as a solid dispersion aid. Thus, the rubber and polyolefin are blended and granulated, and this granular premixture is then mixed at 180° to 250° C. with the bitumen to give the required dispersion. Similarly, GB No. 1 400 145 (Briggs Amasco Limited) discloses bituminous compositions comprising a mixture of bitumen with ethylene propylene ethylidene norbornene terpolymer and polyethylene in a minor amount compared with the rubber. However, neither of these documents teaches the use of rubbers having a broad compositional distribution with regard to the ethylene content.

GB No. 1 519 508 (HULS) discloses the manufacture of homogenous thermoplastic compositions in ribbon or granule form, which comprise blends of defined polyblefin rubber, optionally additionally a polyolefin, and bitumen. The rubber may be an ethylene propylene rubber which is a sequence polymer, that is a copolymer containing ethylene or an alpha-olefin in addition to a statistical distribution of the monomers in the polymer chain in the form of chain sections of varying length (sequences). This gives the polymer good raw strength (at least 20 kp/cm$^2$ at 25° C.) and hence permits manufacture in comminuted form which is advantageous for the blending process. Again, though, there is no teaching to use rubbers of broad compositional distribution with regard to the ethylene content.

U.S. Pat. No. 4,110,414 (Goodrich) discloses mouldable thermoplastic polymer blends of high tensile strength prepared by mixing low density polyethylenes and high molecular weight ethylene propylene copolymers under conditions of heat and shear. The EP copolymer has a methylene run index, i.e., a measure of the ratio of methylene units in runs of seven or more to the sum of the runs of three methylene units plus the runs of two methylene units, of 20 or above, but there is no suggestion here that such blends might be useful for modifying bitumen.

It has now surprisingly been found that bitumen may be advantageously modified, particularly but not exclusively for roofing applications, by a combination of a polyolefin component and an elastomeric component of specific characteristics.

According to the present invention there is provided a bituminous composition which comprises bitumen and, dispersed therein in an amount sufficient to modify the bitumen to improve its low temperature and high temperature properties, particularly its suitability for roofing applications, a modifier comprising a polyolefin component containing polyethylene and polypropylene, and an elastomeric component characterised in that the elastomeric component comprises an ethylene-propylene copolymer having a broad compositional distribution with regard to its ethylene content. Such bituminous compositions are also termed "polymer asphalt blends" (PAB) herein.

According to a further aspect of the invention there is provided the use of a modifier composition as defined above as an additive for bitumen.

By ethylene-propylene copolymers (EPR) having a broad compositional distribution (BCD) there is meant EPR having individual polymeric chains with respective ethylene contents which are broadly distributed about the average ethylene content of the copolymer. Typically EPRs with broad compositional distribution include polymeric chains of ethylene content at least 5, preferably at least 10, weight percent absolute greater than the average ethylene content of the copolymer, and polymeric chains of ethylene content at least 5, preferably at least 10, weight percent absolute less than said average ethylene content. Preferably for the purposes of this invention the ethylene content of the individual polymer chains includes values of from 5 to 25, more preferably 10 to 25, wt % absolute above and 5 to 25, more preferably 10 to 25 wt % absolute below the ethylene content of all the polymer chains (depending on the average ethylene content). Thus, for a BCD-EPR of ethylene content 40%, individual chains could be extracted which have ethylene contents as low as 15 wt % to as high as 65 wt % for the broadest compositional distribution.

The term ethylene propylene copolymer (EPR) as used herein means an elastomeric polymer formed from at least two monomers, one of which must be ethylene and one propylene. Thus, it includes EPM rubbers, and also unsaturated rubbers where a minor proportion of one or more polyenes such as the endomethylenes, 5-ethylidene norbornene, 5-methylene norbornene and dicyclopentadiene, or a non conjugated aliphatic diene such as 1,4hexadiene is included in the polymeric chains, commonly termed EPDM rubbers.

The compositional distribution of an EPR is characterised by the variation in ethylene to propylene ratio among the chains and within the chains. For example if all the chains have the same composition and the chains have that compositon from end-to-end then the material is said to have a narrow compositional distribution. If chains, one versus another, vary greatly in composition then the compositional distribution is said to be broad that is the individual polymer chains do not all have the same % content of ethylene monomeric units, but together span a range of ethylene contents.

The compositional distribution of an EP copolymer may be determined for example by using extraction techniques, solvent fractionation, or gel permeation chromatography to split the copolymer into its various molecular weight fractions. The ethylene content of these fractions is then measured by a standard method such as infra-red absorption or nuclear magnetic resonance. Thus according to one fractionation technique the copolymer is dissolved in a solvent such as hexane, and aliquots of a precipitant such as an alcohol are progressively added. High molecular weight fractions are precipitated first, with lower molecular weight fractions being deposited as the alcohol concentration increases. According to another technique the solid copolymer is deposited on glass beads, and then progressively eluted therefrom by treatment with amounts of progressively more powerful solvent, for example alcohol/hexane mixtures with increasing hexane concentration, or by the same strength solvent at increasing temperatures. Here, the low molecular weight fractions are eluted first, followed by higher molecular weight fractions. It has been found that with EPRs having a low average ethylene content, e.g.approx. 40 wt %, the longer chain (higher molecular weight) fractions tend to have a higher ethylene content than the shorter chain (lower molecular weight) fractions. However this is not necessarily the case with broad compositional distribution EP copolymers with higher average ethylene contents The compositional distribution of the copolymer may be defined, as above, in terms of the extremes of composition versus the average ethylene content; or alternatively by determining the entire range of composition among the chains.

It has been found that modified bitumens in accordance with the invention yield much better properties (for example low temperature and elastic). Thus at low temperatures close to glass transition temperature the flexibility of the material is increased whilst at high temperatures e.g. glass transition temperature +130 degrees C., the flow is decreased i.e. softening point is increased. By high temperatures as mentioned hereinbefore there is meant the sort of temperatures to which roofing felts incorporating the PAB may be routinely subjected in use at various locations throughout the world, or to which PABs are subjected during testing for suitability for such applications. For example these high temperatures may be in the range 70°–130° C., particularly 80°–120° C. and especially 100°–120° C. It is emphasised here, though, that the PABs according to the invention are not limited in their use-to roofing applictions, but may also be used for example in pipe-wrapping applications. By low temperatures as mentioned hereinbefore there is meant the sort of temperatures to which for example rolls of roofing felt incorporating the PAB may be subjected prior to unrolling such rolls for application to a roof surface at various locations worldwide, or to which PABs are subjected for testing their suitability for such applications. For example these low temperatures may be in the range 0° to −30° C., particularly −15 to −25 C.

For roofing applications, such modified bitumens compare well with bitumen treated with conventional modifying systems such as those wherein the EP copolymers have a narrow compositional distribution or wherein the EPR is not in combination with the polyolefin component. It is speculated that this improvement derives from the interaction of the broad compositional distribution polymer chains with the polyolefin components of the modifier system and the bitumen.

The use of BCD-EPRs in bitumen (asphalt) modifier systems according to the invention has been found to be particularly advantageous when the copolymer has a low average ethylene content, for example less than 50% or 53% by weight, particularly from 40 to 45 wt %. In general, the lower the ethylene content of an EPR, the lower is its crystallinity. It is known that bitumen modified with EPR of high crystallinity (high ethylene content) has an improved mechanical stength, but by virtue of this high ethylene content such EP copolymers are considerably more difficult to incorporate into the bitumen than low ethylene content EPRs. According to the invention modifier systems including EP copolymers of low average ethylene content but broad compositonal distribution not only give improved properties to the bituminous composition, but also are more readily incorporated into the bitumen by the techniques common in the art. It is speculated that low ethylene content, broad compositional distribution EP copolymers have, despite their low average ethylene content, an increased crystallinity because they include polymeric chain segments containing ethylene in a proportion which is at least 5 wt % absolute greater than the average. Thus, certain copolymer chain segments will effectively contain blocks of "polyethylene" which interact with each other and with the polyethylene in the modified bitumen. The lower ethylene content chain segments interact with the polypropylene and the bitumen. With normal narrow compositional distribution EP copolymers (NCD-EP) much higher ethylene contents are required to yield such interaction with polyethylene. Moreover there are fewer low ethylene chain segments in the high ethylene NCD-EP copolymers to interact with the bitumen and polypropylene. Of course in accordance with the invention BCD-EPRs with relatively high ethylene contents, e.g., 50 to 70 or even 80% may be used, but here the advantages of the BCD are less evident by virtue of the inherent high crystallinity of these materials.

According to another aspect of the invention there is provided a method of producing bituminous compositions as hereinbefore defined which comprises first forming a modifier masterbatch of the BCD-EPR and the polyolefin component containing polyethylene and polypropylene, and subsequently incorporating the masterbatch into the bitumen.

By way of example-the masterbatch may be prepared by incorporating all the ingredients in an internal mixer e.g. Banbury type, and mixing for about 3 minutes at flux temperature e.g. about 140° C. Subsequently the mixture is pelletised using a single screw extruder, and the pellets dusted with talc to prevent agglomeration. This method is useful for laboratory scale work. For more economical bulk scale work, mixing and pelletisation may be performed for example in a high intensity dual screw continuous mixer, such as a Werner-Pfleiderer or a Farrel, with a die temperature of about 180° C.

Any form of bitmen may be used provided it is compatible with the modifier. For example the bitumen may be Safaniya 180/220, which is a non-blown (non-oxidised) straight bitumen of moderate aromaticity from Saudi Arabia.

It has been found that such modifiers may be incorporated into the bitumen using conventional blending equipment to give a homogeneous blend which is generally stable on storage and of a viscosity that may be processed under normal roofing material manufacturing conditions. Thus yet another aspect of the invention provides for the use of such bituminous compositions as roofing materials, which are generally found to have desirable physical properties which are retained after heat ageing.

By way of example, the modifier may be incorporated into the bitumen under laboratory conditions by heating the bitumen to 200°-205° C. in a rapidly (1000 rpm) stirred glass reactor and adding modifier in pellet form over 15 minutes without vortex formation, stirring being continued for about 1 hour after the addition. Dispersion quality may be checked visually (film test, or preferably using a microscope). Alternatively paddle mixing at e.g. 60 rpm for about 4 hour may be employed. On a bulk scale an industrial paddle mixer at e.g. 20 rpm may be used, with addition of modifier over e.g. 1 hour and further mixing at reduced temperature e.g. 180°-190° C. optionally with addition of filler, for about 1 hour.

The modifier system is preferably incorporated in the bitumen in a proportion of from 5 to 20% by weight based on the composition as a whole, such a proportion having been found to give optimum end product physical properties in conjunction with commercial acceptability. More preferred is the range 9 to 16 wt % and particularly the range 12 to 16 wt %. Such compositions generally have been found to have good high temperature properties, e.g., softening points in excess of 100° C., which is a requirement for roofing applications (thought to derive in part from the polyethylene content of the polyolefin component); and good low temperature properties, e.g., brittle failure only at −10° C. or below (thought to derive in part from the polypropylene content of the polyolefin component).

The polyethylene is preferably high density polyethylene (HDPE), and the polypropylene is preferably atactic polypropylene (APP), with the ratio between these two in the polyolefin component depending to a great extent on the properties required of the bituminous composition. For example APP tends to depress softening point but improve low temperature characteristics, whereas HDPE tends to increase the softening point for example to 120°-130° C. which is highly desirable for roofing applications. However HDPE may be detrimental to elasticity by virtue of its high crystallinity. From the above it may be considered that the APP functions as a plasticizer for the rubber, and in this regard it functions even for EPRs which do not have a broad compositional distribution.

As mentioned, the composition of the modifier may vary in dependence on the desired end properties. Preferably the modifier will comprise from 40 to 60 wt % of the elastomeric component, or indeed even greater amounts of BCD-EPR, for example from 50 to 75%, with the balance being polyolefin component. In this polyolefin component the ratio of polyethylene to polypropylene is preferably in the range 40:60 to 60:40 by weight, more preferably in the ratio 1:1. A particularly useful modifier system contains BCD-EPR:APP:HDPE in the weight ratio 50:25:25. The modifiers may also contain additives such as stabilizers and antioxidants. Preferably reinforcing fillers such as carbon black or silica are not used since although they can improve the softening point of the bituminous composition, their presence tends to increase brittle failure at low temperatures.

The BCD-EPRs which have been found to be useful in bituminous compositions according to the invention may be produced by conventional copolymerisation techniques adapted to yield the BCD product by control of process conditions as is well understood in the art. For example the degree of agitation in the copolymerisation reactor can be adjusted to give the desired product. Alternatively, of the numerous copolymerisation catalyst systems that are known, the various combinations of catalyst and cocatalyst can be adjusted by relatively simple testing methods to yield EPRs having the compositional distribution of any sufficient breadth for the proposed end use of the bituminous composition.

The bituminous compositions of the present invention may be processed into roofing materials by standard processing techniques. They may be used to impregnate felts and as intermediate layers in the traditional multilayer roofing materials; however they are primarily intended for use in the preparation of single or double layer roofing materials. In either circumstance it has been found that the use of the bitumen compositions of the present invention permits the fabrication of roofing materials of improved viscoelastic properties. Softening point, low temperature flexibility and ageing characteristics are also generally improved.

The following Examples illustrate the invention.

EXAMPLE 1

A modifier masterbatch was produced by blending together a BCD-EPR, APP and HDPE in a ratio by weight of 50:25:25. The EPR had an average ethylene content of 42% by weight, and a broad compositional distribution (as hereinbefore defined) by virtue of the catalyst system employed in its production. Its density was 0.86 g/cc (23° C.); $M_L(1+8)$ value 33 at 100° C. inherent viscosity 3.34 (in decalin at 135° C.); and molecular weight characteristics (by GPC in 1,2,4 trichlorobenzene at 135° C.) $M_n=6300$, $M_w=296,000$, $M_w/M_n=47$, broad MWD. The APP was AMOCO grade 115-601 A of density 0.85 g/cc at 23° C., Brookfield viscosity range 200-1200 cps at 190° C., and ash content 0.05 wt. % max.

The HDPE was HD 6950 (ESSO), a narrow molecular weight distribution product of density 0.963 g/cc (23° C., ASTM D 1505); and melt index 7 g/10 min (ASTM D 1238, 2.16 kg load).

Blending was by incorporating all the ingredients in a Banbury internal mixer and mixing at flux temperature (about 140° C.) for 3 minutes. Thereafter the blend was pelletised in a single screw extruder and the pellets dusted with talc to prevent agglomeration.

To yield a bituminous composition containing 12 wt % modifier and 88 wt % bitumen, the modifier was then incorporated into a 200 penetration straight bitumen of Safaniya origin. Thus the bitumen was heated to 200°-205° C. in a rapidly stirred glass reactor and masterbatch pellets were added over a 15 minute period, without vortex formation (but with dimples being observed at the bitumen/air interface). After the addition mixing was continued for 1 hour.

The composition was tested for its suitability for roofing applications by the following methods.

(a) Softening point: by the "Ring and Ball" method, ASTM D-36, expressed in ° C.

(b) Foldability: by a non-standard method, a strip of the bituminous composition (2×30×100 m) is conditioned at a constant temperature for 1 hour and then folded (over a period of 5 seconds) around a mandrel of 10 mm diameter.

If the sample does not exhibit surface microcracks, the procedure is repeated at a lower temperature (reduced by 5 degrees C stepwise) until such time that microcracks do appear onfolding, the temperature of first cracking being considered as the foldability value.

Results of the tests showed a high softening point of 119° C. and a low foldability value of −10° C., these being excellent values for roofing applications.

EXAMPLE 2

The procedure of Example 1 was repeated but using a BCD-EPR of average ethylene content 65 wt %. Test results gave a softening point of 116° C. and a foldability value of −10° C.

COMPARISON EXAMPLE 3

Example 1 was repeated, but using an EPR which although having an ethylene content of 42%, had a narrow compositional distribution. Test results gave values of 84° C. and −5° C. respectively for softening point and foldability.

Such values are not acceptable for roofing applications where the product will be subjected to extremes of hot and cold weather.

COMPARISON EXAMPLE 4

Example 1 was repeated, using an EPR with an ethylene content of 65%. The EPR had the same Mooney viscosity as that of Example 1, but an extremely narrow compositional distribution. Moreover it had a narrow MWD ($M_w/M_n=2$). The crystallinity of this rubber was so high that it was found to be extremely difficult to produce the modifier in the Banbury mixer. Thus a much longer (and hence less economical) mixing time was required to form the modifier blend. Test results gave values of 119° C. and −10° C. for softening point and foldability respectively which of course compares well with Example 1, but for a much higher ethylene content of the rubber, and a much less convenient and uneconomical blending procedure.

We claim:

1. A bituminous composition which comprises bitumen and, dispersed therein in an amount sufficient to modify the bitumen to improve its low temperature and high temperature properties, a modifier comprising a polyolefin component containing polyethylene and polypropylene the ratio of polyethylene to polypropylene being about 40:60 to 60:40, and an elastomeric component, said elastomeric component consisting essentially of an ethylene-propylene copolymer having a broad compositional distribution with regard to its ethylene content, said copolymer being a copolymer having polymeric chains of ethylene content at least 5 wt % absolute greater than the average ethylene content of the copolymer, and polymeric chains of ethylene content at least 5 wt. % absolute less than said average.

2. A composition according to claim 1, wherein the copolymer includes polymeric chains of ethylene content from 5 to 25 wt % absolute greater than the average and from 5 to 25 wt % absolute less than said average.

3. A composition according to claim 1, wherein the copolymer has an average ethylene content of less than 53 wt %.

4. A composition according to claim 3, wherein the copolymer has an average ethylene content of from 40 to 45 wt %.

5. A composition according to claim 1, wherein the copolymer comprises EPM rubber.

6. A composition according to claim 1, wherein the copolymer comprises EPDM rubber.

7. A composition according to claim 1, wherein the polyethylene is high density polyethylene and the polypropylene is atactic polypropylene.

8. A composition according to claim 1, which comprises from 5 to 20 wt % modifier, based on the composition as a whole.

9. A composition according to claim 8, which comprises from 12 to 16 wt % modifier.

10. A composition according to claim 1 wherein the modifier comprises from 40 to 60 wt % of elastomeric component, based on the modifier as a whole.

11. A composition according to claim 1, which comprises from 12 to 16 wt % of a modifier comprising copolymer, atactic polypropylene and polyethylene in a weight ratio of 50:25:25, said copolymer having an average ethylene content of about 40 wt % and containing individual chains with ethylene contents of about 15 to 35 wt % and about 45 to 65 wt %, and from 84 to 88 wt % of a 180/220 penetration bitumen.

12. A method for producing a bituminous composition comprising bitumen and, dispersed therein in an amount sufficient to modify the bitumen to improve its low temperature and high temperature properties, a modifier comprising (1) a polyolefin component containing polyethylene and polypropylene the ratio of polyethylene to polypropylene being about 40:60 to about 60:40 and (2) an elastomeric component, said elastomeric component consisting essentially of an ethylene-propylene copolymer having a broad compositional distribution with regard to its ethylene content, said copolymer being a copolymer having polymeric chains of ethylene content at least 5 wt. % absolute greater than the average ethylene content of the copolymer, and polymeric chains of ethylene content at least 5 wt. % absolute less than said average, wherein the polyethylene, polypropylene and ethylene-propylene copolymer are blended together to form the modifier, and said modifier is then mechanically dispersed as a masterbatch in the bitumen.

13. A bitumenous composition according to claim 1, when in the form of a roofing material.

14. A method of protecting a roof which comprises applying thereto a bituminous composition according to claim 13.

15. The use as an additive for bitumen of a modifier composition comprising a polyolefin component comprising (1) polyethylene and polypropylene, the ratio of polyethylene to polypropylene being about 40:60 to about 60:40 and (2) an elastomeric component, wherein the elastomeric component is an ethylene-propylene copolymer having a broad compositional distribution with regard to its ethylene content said copolymer being a copolymer having polymeric chains of ethylene content at least 5 wt. % absolute greater than the average ethylene content of the copolymer, and polymeric chains of ethylene content at least 5 wt. % absolute less than said average.

16. A composition according to claim 12, wherein the polyethylene is high density polyethylene and the polypropylene is atactic polypropylene.

17. A composition according to claim 15, wherein the polyethylene is high density polyethylene and the polypropylene is atactic polypropylene.

* * * * *